(12) United States Patent
Chang et al.

(10) Patent No.: US 9,319,677 B2
(45) Date of Patent: Apr. 19, 2016

(54) VIDEO DECODING METHOD AND SYSTEM THEREOF

(71) Applicant: MEDIATEK INC., Hsin-Chu (TW)

(72) Inventors: Yung-Chang Chang, New Taipei (TW); Chia-Yun Cheng, Hsinchu County (TW); Chi-Cheng Ju, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 318 days.

(21) Appl. No.: 14/165,599

(22) Filed: Jan. 28, 2014

(65) Prior Publication Data

US 2014/0133580 A1    May 15, 2014

Related U.S. Application Data

(63) Continuation of application No. 12/186,541, filed on Aug. 6, 2008, now Pat. No. 8,675,738.

(51) Int. Cl.
*H04N 7/12*    (2006.01)
*H04N 19/44*    (2014.01)
*H04N 19/423*    (2014.01)
*H04N 19/433*    (2014.01)
*H04N 19/59*    (2014.01)
*H04N 19/577*    (2014.01)

(52) U.S. Cl.
CPC ....... *H04N 19/00533* (2013.01); *H04N 19/423* (2014.11); *H04N 19/433* (2014.11); *H04N 19/44* (2014.11); *H04N 19/577* (2014.11); *H04N 19/59* (2014.11)

(58) Field of Classification Search
IPC ....................................................... H04N 19/15
See application file for complete search history.

(56) References Cited

U.S. PATENT DOCUMENTS

| 6,539,120 B1* | 3/2003 | Sita ............................ G06T 1/60 |
| | | 348/E5.108 |
| 7,986,846 B2* | 7/2011 | Seo .................. H04N 21/25808 |
| | | 375/240.25 |
| 8,442,122 B2* | 5/2013 | Lefol ................... H04N 19/176 |
| | | 375/240.02 |
| 2005/0062885 A1* | 3/2005 | Kadono ............... H04N 19/137 |
| | | 348/407.1 |

* cited by examiner

*Primary Examiner* — Tracy Li
(74) *Attorney, Agent, or Firm* — Winston Hsu; Scott Margo

(57) ABSTRACT

A video decoding method for decoding a bit stream to a plurality of frames, applied in a video decoding system, includes: determining whether a size of a current picture is equal to that of a next picture according to the bit stream; scaling a corresponding reference frame for the next picture to generate a scaled frame when the size of the current picture is not equal to that of the next picture; and storing the scaled frame in a first buffer of a storage unit, wherein at least a portion of a first frame originally stored in the first buffer is used; wherein when it is determined that the size of the current picture is not equal to that of the next picture, the next picture is encoded in the bit stream in a mode that the scaled corresponding reference frame is required for decoding the next picture.

30 Claims, 7 Drawing Sheets

VIDEO DECODING METHOD AND SYSTEM THEREOF

CROSS REFERENCE TO RELATED APPLICATIONS

This continuation application claims the benefit of U.S. application Ser. No. 12/186,541, which was filed on Aug. 6, 2008.

BACKGROUND

FIG. 1 illustrates a related art video decoding method in a Reference Picture Resampling (RPR) mode. It is noted that the RPR mode, utilized in video standards such as H. 263+ and RealVideo standards, is a mode allows video encoder or decoder to change picture size on a frame-by-frame basis. As shown, a bit stream is decoded to generate a plurality of frames, and different classes of frames are respectively stored to a plurality of buffers, where the first and second sequences respectively show the frame decoding order and corresponding storing buffers. For example, an I frame I0 is stored in the reference buffer RB1, a P frame P1 is stored in the reference buffer RB2, B frames B2 and B3 are stored in the B frame buffer BB. When decoding frames encoded in the RPR mode; however, it is required to scale a corresponding reference frame and an additional RPR frame buffer is required to store scaled frames such as P frames P1s and P4L which respectively represent the scaled picture of P frame P1 with smaller resolution and the scaled picture of P frame P4 with larger resolution. The necessity of the RPR frame buffer increases the related cost.

SUMMARY OF THE INVENTION

One embodiment of the present invention discloses a video decoding method for decoding a bit stream to a plurality of frames, comprising: determining whether a size of a current picture is equal to that of a next picture according to the bit stream; scaling a corresponding reference frame for the next picture to generate a scaled frame when the size of the current picture is not equal to that of the next picture; and storing the scaled frame in a first frame buffer of a storage unit, wherein at least a portion of a first frame originally stored in the first frame buffer is displayed.

Another embodiment of the present invention discloses a video decoding system for decoding a bit stream to a plurality of frames, and the video decoding system includes a video decoder, a scaler and a storage unit. The video decoder is utilized for determining whether a size of a current picture is equal to that of a next picture according to the bit stream. The scaler is utilized for scaling a corresponding reference frame for the next picture to generate a scaled frame when the size of the current picture is not equal to that of the next picture. The storage unit includes a first frame buffer for storing the scaled frame, wherein at least a portion of a first frame originally stored in the first frame buffer is displayed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
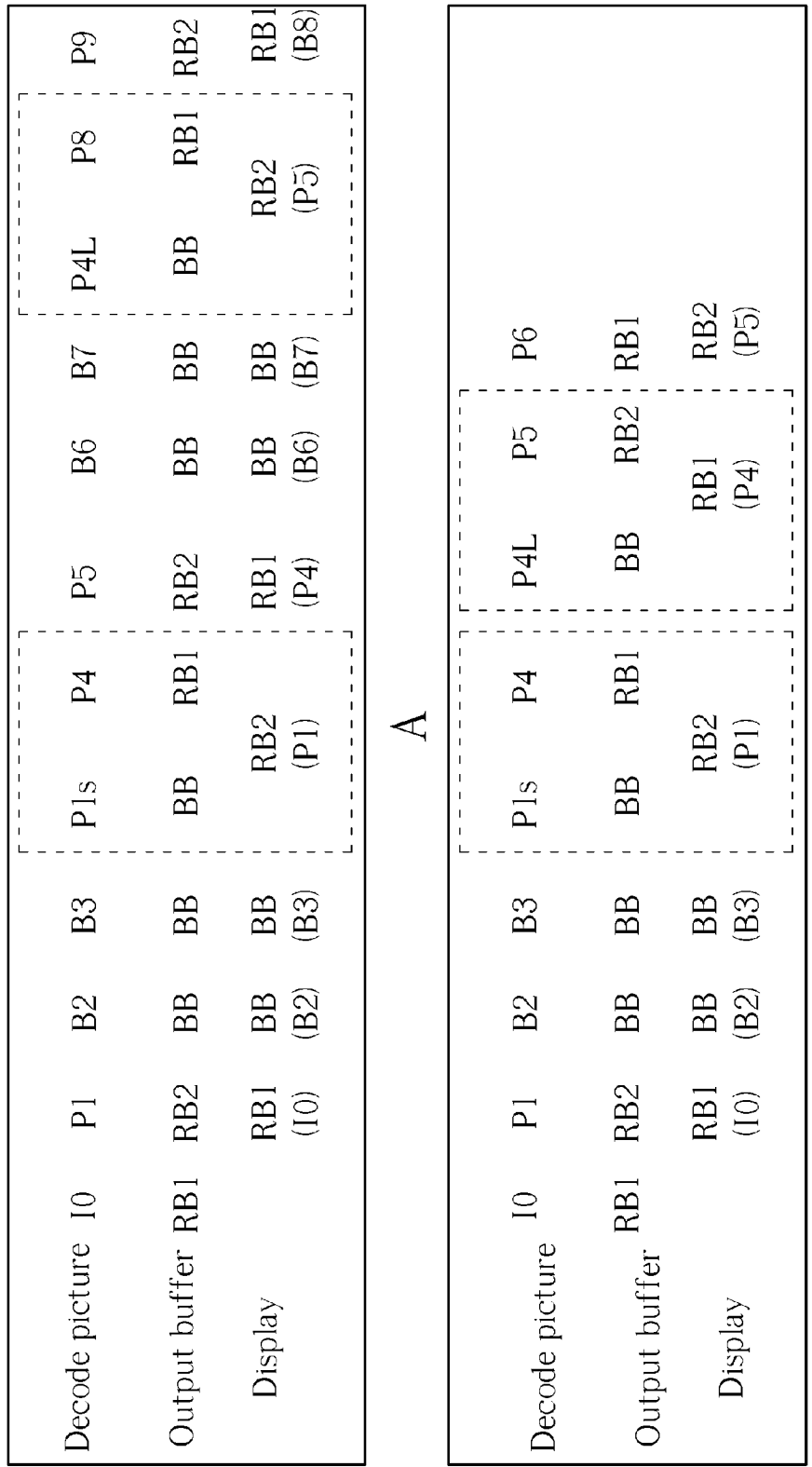
FIG. 2 illustrates a video decoding method according to a first embodiment of the present invention.

FIG. 2 shows a video decoding method according to a first embodiment of the invention. As shown, FIG. 2 includes two parts, part A and part B, and the first, second, and third sequences of each part respectively indicate the frame decoding order, corresponding storing buffers, and currently displayed frame and its corresponding storing buffer. In this embodiment, the conventional RPR frame buffer is not required, and the scaled frame (RPR frame) such as frame P1s is stored to other buffers that have sufficient space. In this case, the RPR frame is stored to a buffer where at least a portion of the frame originally stored therein is displayed. As shown, the frames I0, P1, B2, B3 are decoded and stored in the frame buffers RB1, RB2, BB sequentially as in the related art.

Figure 1:
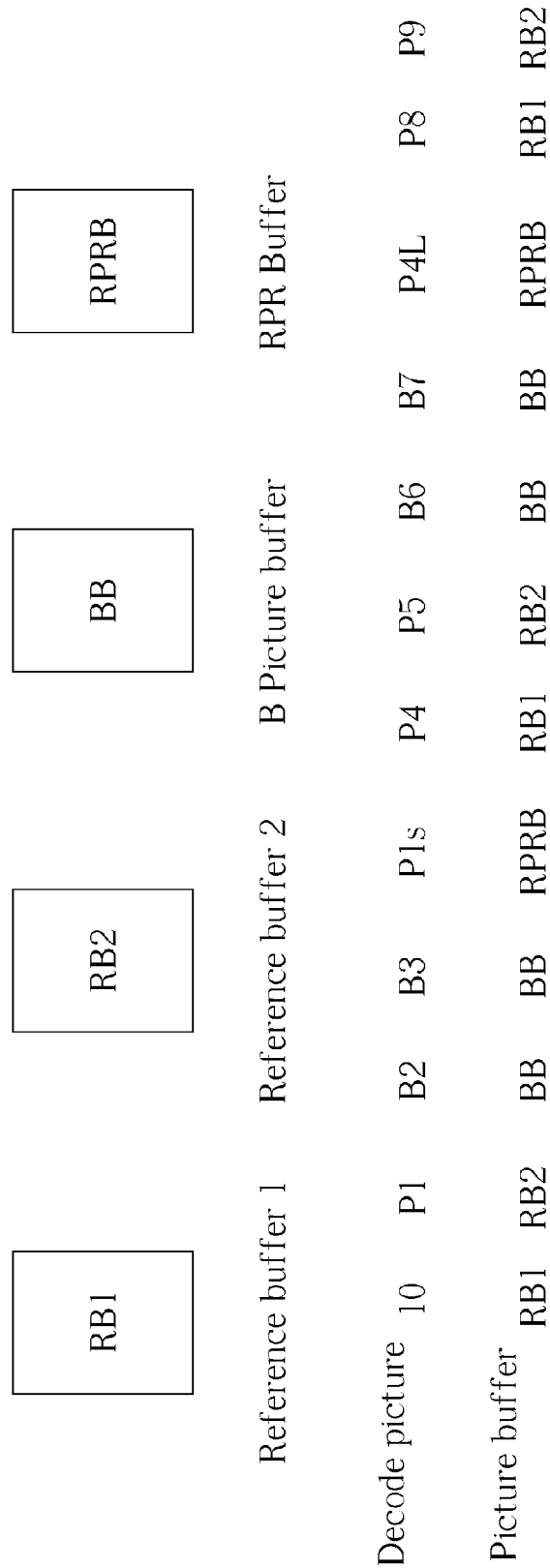
FIG. 1 illustrates a related art video decoding method in an RPR mode.

Also, the frames I0, B2 and B3 are displayed sequentially. Therefore, in order to reduce the reserved store space of the scaled frame P1s (ex. the buffer RPRB shown in FIG. 1), it is stored in a frame buffer having a frame originally stored therein and at least a portion of the originally stored frame has already been displayed. This ensures there is sufficient space for the scaled frame P1s. In this case, the scaled frame P1s is stored to the B frame buffer BB after at least a portion of the frame B3 originally stored in the B frame buffer BB is displayed. Similarly, the scaled frame P4L is stored in the B frame buffer BB after at least a portion of the frame B7 originally stored in the B frame buffer BB is displayed.

The parts A and B shown in FIG. 2 indicate different situations for the scaled frames. In part A, the scaling operation is not continuous. That is, some frames are decoded and displayed (e.g. frames P5, B6, B7) between two scaled frames (P1s and P4L). In part B, however, the frame P4 is decoded with reference to the scaled frame P1s and then the scaled frame P4L is generated via scaling the frame P4, so the scaling operations are continuously performed. Both situations, however, follow the same rules: the scaled frame is stored to a frame buffer after at least a portion of the frame originally stored in the frame buffer is displayed, and the frame buffer have sufficient space for the scaled frames. It should be noted that, although the scaled frame is stored to the B frame buffer, it can be stored to other frame buffers, and this also falls in the scope of the present invention.

Figure 3:
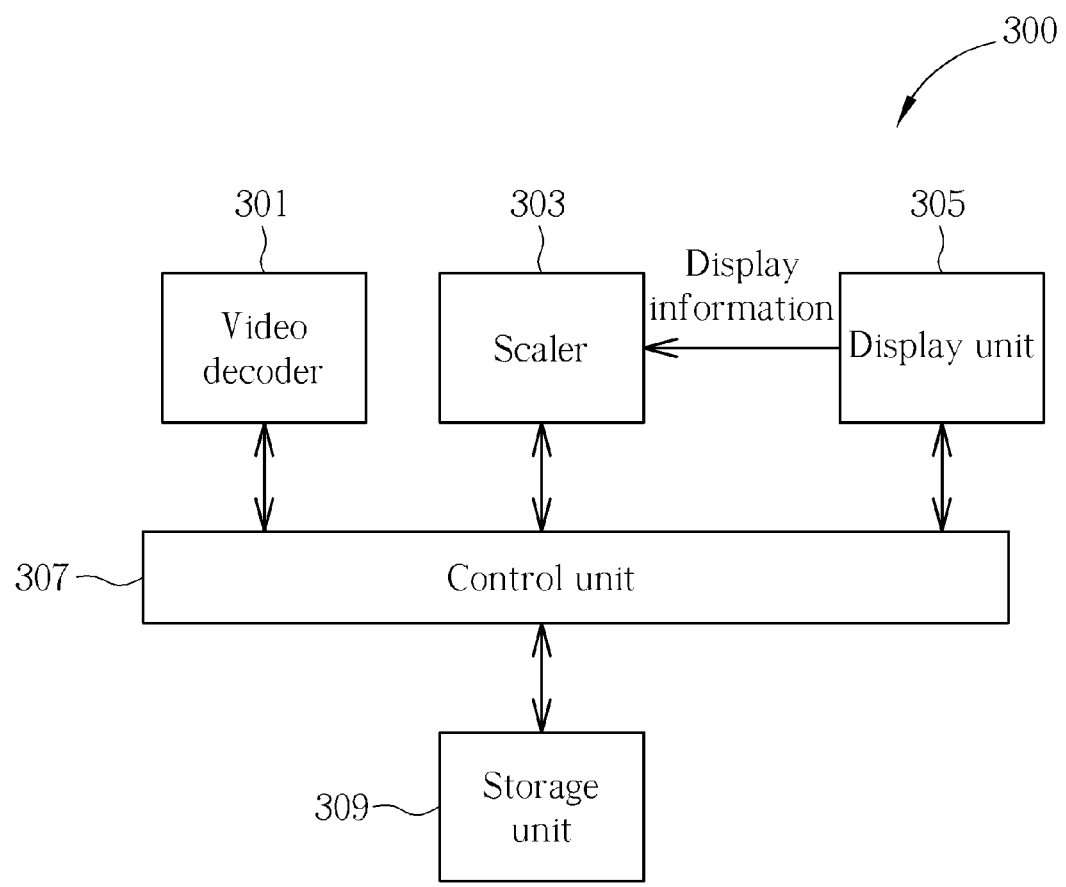
FIG. 3 is a block diagram illustrating a video decoding system according to the first embodiment of the present invention.
Figure 4:
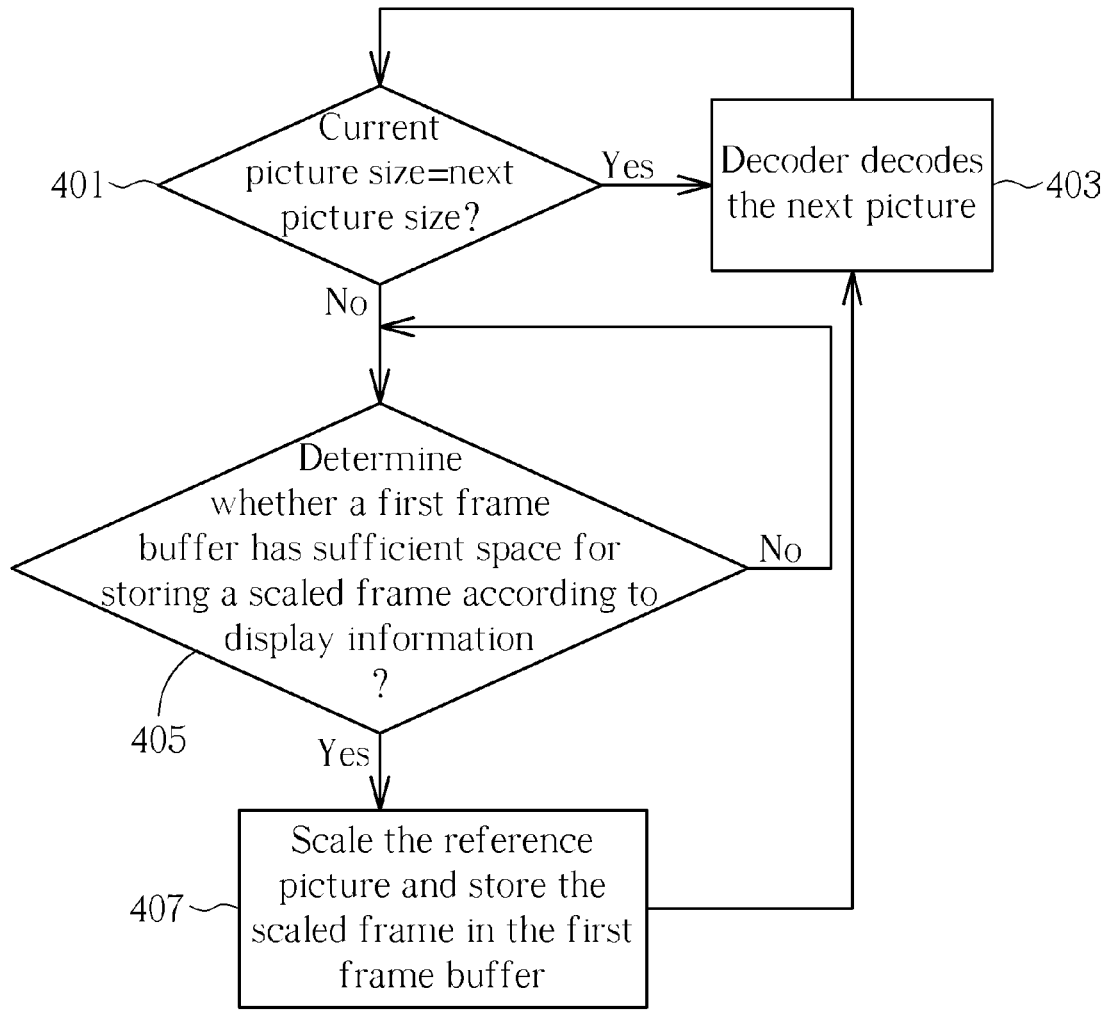
FIG. 4 is a flow chart illustrating the operation of the video decoding system according to the first embodiment of the present invention.

FIG. 3 shows a video decoding system according to a first embodiment of the present invention. FIG. 4 is a flow chart illustrating the operation of the video decoding system according to the first embodiment of the present invention. Please jointly refer to these two figures in order to understand the concept of the present invention more clearly.

As shown in FIG. 3, the video decoding system 300 for decoding a bit stream to a plurality of frames includes a video decoder 301, a scaler 303, a display unit 305, a control unit 307 and a storage unit 309. The control unit 307 controls accessing to the storage unit 309. The scaler 303 scales a reference frame (For example, P1 in FIG. 2) to a scaled frame (P1s) when the video decoder 301 decodes a frame encoded in the RPR mode and stores the scaled frame in a first frame buffer in which at least a portion of a first frame originally stored therein is displayed. In an embodiment of the invention, as shown in FIG. 2, the storage unit 309 comprises two reference frame buffers RB1 and RB2 and a B frame buffer BB respectively storing reference frames and B frames, and the first frame buffer is the B frame buffer BB. The video decoder 301 decodes the bit stream to generate a plurality of frames such as frame B2 in FIG. 2 and stores the decoded frames in buffers of the storage unit 309 via the control unit 307. The display unit 305 displays frames stored in the storage unit 301 and provides display information related to the displayed first frame to the scaler 303 for determining if the first frame buffer of the storage unit 307 has sufficient space for storing the scaled frame P1s.

It is noted that the scaler 303 scales the reference frame to generate the scaled frame when the video decoder 301 decodes a frame encoded in the RPR mode and the scaler 303 determines whether the first frame buffer has sufficient space. The display information is one of display scan line number and a Vsync signal. When the display information is the display scan line number indicating how many scan lines of the currently displayed first frame have been displayed, the scaler 303 determines whether the first frame buffer of the storage unit 309 storing the currently displayed frame has sufficient space for storing the scaled frame in accordance therewith.

When the display information is the Vsync signal of the first frame indicating whether the whole first frame is displayed, the scaler 303 determines whether the first frame buffer of the storage unit 309 storing the displayed first frame has sufficient space for storing the scaled frame in accordance therewith. For example, when the Vsync signal indicates the whole first frame is displayed, the scaler 303 may determine the first frame buffer of the storage unit 309 storing the first frame has space for storing a frame, and thus sufficient for storing the scaled frame. It should be noted that other frame displaying signals that can indicate whether a whole frame is displayed or not can also be applied besides the Vsync signal.

As mentioned above, FIG. 4 discloses the operations of the video decoding system 300 and includes the steps of:

Step 401: The video decoder 301 analyzes the bit stream to determine if a current picture (frame) size is equal to a next picture size. If yes, the method proceeds to step 403; otherwise the method proceeds to step 405.

Step 403: The video decoder 301 decodes the next picture according to at least a corresponding reference picture.

Step 405: The scaler 303 determines whether the first frame buffer of the storage unit 309 (a B frame buffer in this embodiment), in which at least a portion of the first frame originally stored therein is displayed, has sufficient space for storing a scaled frame according to display information related to the first frame from the display unit 305. If yes, the method proceeds to step 407, if not, continue checking the usable space of first frame buffer of the storage unit 309 until yes.

Step 407: The scaler 303 scales a corresponding reference frame for the next picture and stores the scaled frame in the first frame buffer of the storage unit 309, i.e. the B frame buffer, then the method proceeds to step 403.

The operations of the video decoding system 300 in the embodiment are further described in the following referring to FIGS. 2, 3, and 4. For example, when decoding the frame B3, the video decoder 301 analyzes the bit stream and determines a picture size of the current picture B2 is equal to that of the next picture B3 in step 401. The video decoder 301 accordingly decodes the next picture B2 according to corresponding reference picture, where in this case, the corresponding reference picture includes reference frames I0 and P1. However, when decoding the frame P4, the video decoder 301 analyzes the bit stream and determines a picture size of the current picture B3 is not equal to that of the next picture P4 in step 401, which indicates the next picture P4 is encoded in the RPR mode, the scaler 303 accordingly determines whether the B frame buffer of the storage unit 309, in which frame B3 originally stored therein is displayed, has sufficient space for storing a scaled frame according to display information related to the displayed frame B3 from the display unit 305.

As previously described, the display information may be one of display scan line number and a Vsync signal. When the display information is the Vsync signal and it indicates the whole frame B3 originally storing in the B frame buffer is displayed in step 405, the scaler 303 scales a corresponding reference frame for the next picture P4, i.e., frame P1, and stores the scaled frame P1s in the B frame buffer of the storage unit 309 in step 407. In the case of the display information from display unit 305 being a display scan line number related to the displayed first frame B3 originally storing in the B frame buffer, the scaler 303 determines whether the B frame buffer BB has sufficient space for storing a data unit of the scaled frame P1s in step 405.

If it is determined that there is sufficient space in the B frame buffer BB in step 405, the scaler 303 scales the corresponding reference frame P1 for the next picture P4, such as a few lines of the frame P1, to generate a data unit of the scaled frame P1s, and stores the data unit of the scaled frame P1s in the B frame buffer BB of the storage unit 309 in step 407. In this case, however, steps 405 and 407 are repeatedly performed until the whole scaled frame P1s is generated and stored in the B frame buffer BB.

It is noted that the scaled frame is not limited to be stored to a frame buffer after a portion of a frame originally stored therein has been displayed. The scaled frame can be stored to any frame buffer that has sufficient space after other video processes have been performed.

Figure 5:
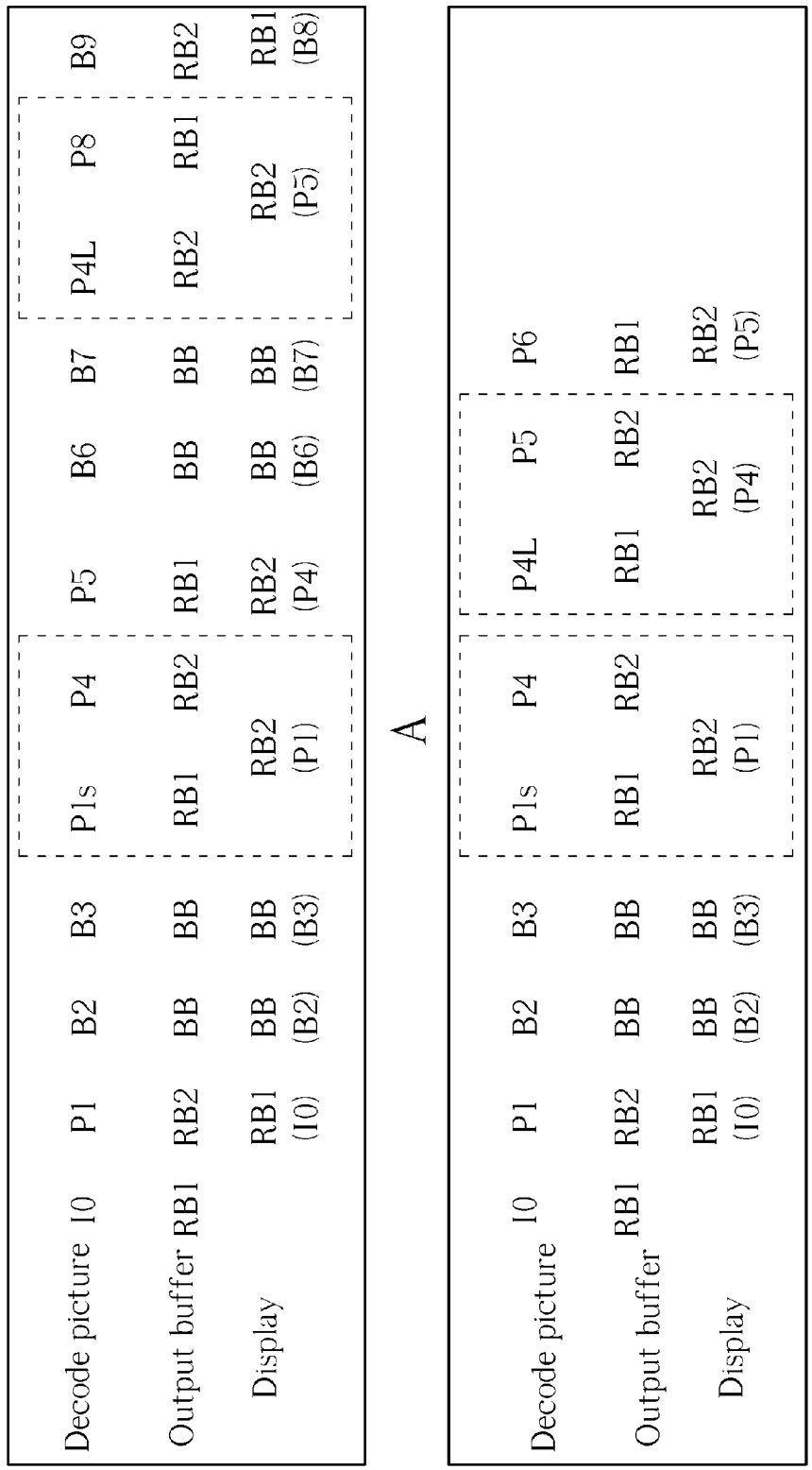
FIG. 5 illustrates a video decoding method according to a second embodiment of the present invention.

FIG. 5 shows a video decoding method according to a second embodiment of the present invention. As shown, the scaled frame also has no frame buffer thereof, and thus should be stored to a frame buffer originally used to store other frames. Similar to FIG. 2, FIG. 5 also includes two parts, part A and part B, and the first, second, and third sequences of each part respectively indicate the frame decoding order, corresponding storing buffers, and currently displayed frame and its corresponding storing buffer. Compared with the embodiment shown in FIG. 2, the embodiment shown in FIG. 5 determines if the buffer has sufficient space at the time of decoding the next picture using the scaled frame as a reference picture instead of the time of scaling an original frame to the scaled frame. For example, as shown, when decoding the next frame P4 after generation of the scaled frame P1s which is stored in the reference frame buffer RB1, it is determined whether the frame buffer RB2 storing the frame P1 which is being displayed has sufficient space for storing the frame P4. In this embodiment, data units of the frame P4 such as data unit in macroblock base, can be decoded simultaneously and stored in the frame buffer RB2 after at least a portion of the frame P1 which is originally stored therein is displayed. Similar with FIG. 2, the parts A and B shown in FIG. 5 indicate different situations for the scaled frames. In part A, the scaling operation is not continuous. That is, some frames are decoded and displayed (e.g. frames P5, B6, B7) between two scaled frames (P1s and P4L). In part B, however, the frame P4 is decoded with reference to the scaled frame P1s and then the scaled frame P4L is generated via scaling the frame P4, so the scaling operations are continuously performed.

Figure 6:
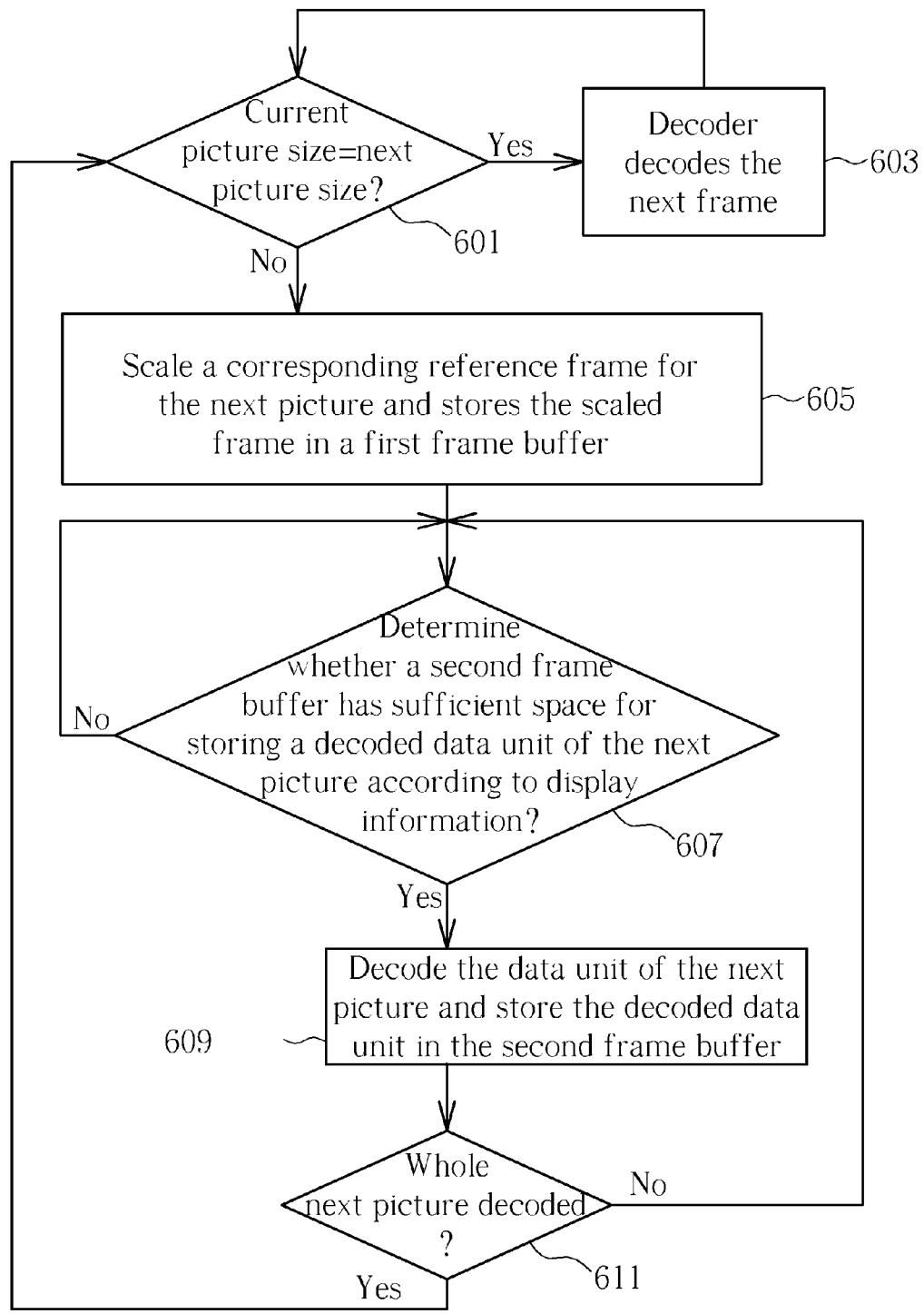
FIG. 6 is a flow chart illustrating the operation of the video decoding system according to the second embodiment of the present invention.

FIG. 6 is a flow chart illustrating the operation of the video decoding system according to a second embodiment of the present invention. Please jointly refer to the video decoding system 700 shown in FIG. 7 and FIG. 6 in order to understand the second embodiment of the present invention more clearly.

The flow chart shown in FIG. 6 includes the steps of:

Step 601: The video decoder 701 analyzes the bit stream to determine if a current picture (frame) size is equal to a next picture size. If yes, the method proceeds to step 603. If not, the method proceeds to step 605.

Step 603: The video decoder 701 decodes the next picture according to at least a corresponding reference picture.

Step 605: The scaler 703 scales a corresponding reference frame for the next picture and stores the scaled frame in a first frame buffer of the storage unit 709 (a reference buffer RB1 in this embodiment), in which at least a portion of the first frame originally stored therein is displayed. The method proceeds to step 607.

Step 607: The video decoder 701 determines whether a second frame buffer of the storage unit 709 (a reference buffer RB2 in this embodiment), in which at least a portion of a second frame stored therein has been displayed, has sufficient space for storing a decoded data unit of the next picture according to display information related to the displayed second frame from the display unit 705. If yes, the method proceeds to step 609. If not, perform the step 607 repeatedly.

Step 609: The video decoder 701 decodes the data unit of the next picture (frame) with reference to the scaled frame and stores the decoded data unit of the next picture in the second frame buffer in which the originally stored frame P1 is simultaneously displayed by the display unit 705.

Step 611: Determine if the whole next picture (frame) is decoded. If yes, the method proceeds to step 601, if not, go back to step 609.

Figure 7:
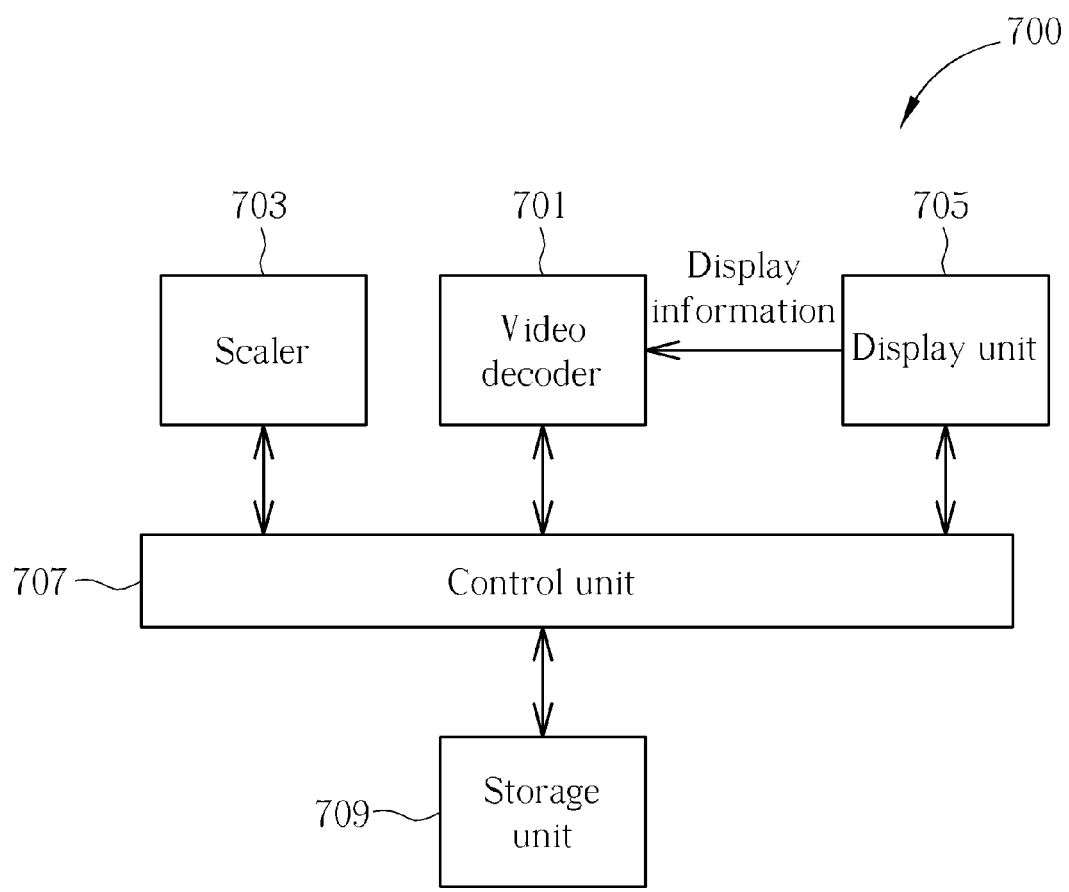
FIG. 7 is a block diagram illustrating a video decoding system according to the second embodiment of the present invention.

The operations of the video decoding system 700 in the embodiment are further described in the following referring to FIGS. 7, 5, and 6. When start to decode the frame P4, if the video decoder 701 analyzes the bit stream and determines a picture size of the current picture B3 is not equal to that of the next picture P4 in step 601, the scaler 703 accordingly scales a corresponding reference frame P1 for the next picture P4 and stores the scaled frame P1s in the reference buffer RB1 of the storage unit 709 in which the frame I0 originally stored therein has been displayed in step 605. The video decoder 701 then determines whether the reference buffer RB2 of the storage unit 709, in which at least a portion of the frame P1 stored therein has been displayed has sufficient space for storing a decoded data unit of the next picture P4 according to display information related to the displayed P1 frame from the display unit 705 in step 607.

For example, when a portion of the frame P1 stored in the frame buffer RB2 has been displayed, the display unit 707 provides the display information being the display scan line number of the displayed frame P1, indicating how many scan lines of the frame P1 have being displayed so that the video decoder 701 can determines whether the frame buffer RB2 storing the displayed frame P1 has sufficient space for storing the decoded data unit of the next picture (frame) P4, such as a macroblock.

When the video decoder 701 determines the frame buffer RB2 has sufficient space for storing the decoded data unit of the next picture (frame) P4 in step 607, the video decoder 701 decodes the data unit of the next picture P4 with reference to the scaled frame P1s, and stores the decoded data unit in the frame buffer RB2 in step 609. The video decoder 701 further determine whether the whole next picture P4 has been decoded, if NO, go back to step 607 for determining whether the frame buffer RB2 has sufficient space and if Yes, go back to step 601.

It should also be noted that the decoded data unit is not limited to be stored to a frame buffer after a frame stored therein has been displayed. The decoded data unit can be stored to any frame buffer that has sufficient space after other video processes have been performed.

Via the above-mentioned embodiments, the RPR frame buffer can be omitted and the product cost can thereby be decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method for decoding a bit stream to a plurality of frames, applied in a video decoding system, comprising:
   determining whether a size of a current picture is equal to that of a next picture according to the bit stream;
   scaling a corresponding reference frame for the next picture to generate a scaled frame when the size of the current picture is not equal to that of the next picture; and
   storing the scaled frame in a first buffer of a storage unit, wherein at least a portion of a first frame originally stored in the first buffer is used;
   wherein when it is determined that the size of the current picture is not equal to that of the next picture, the next picture is encoded in the bit stream in a mode that the scaled corresponding reference frame is required for decoding the next picture.

2. The method of claim 1, wherein the mode is a Reference Picture Resampling (RPR) mode.

3. The method of claim 1, further comprising:
   decoding the next picture when it is determined that the size of the current picture is equal to that of the next picture.

4. The method of claim 1, wherein the first frame is used for displaying.

5. The method of claim 4, wherein the first frame is a B frame and the first buffer is for storing B frames, and further comprising:

determining whether the first buffer has sufficient space for the scaled frame according to display information of the displayed first frame prior to scaling the corresponding reference frame.

6. The method of claim 5, wherein the display information of the displayed first frame is a frame displaying signal indicating whether the whole first frame is displayed.

7. The method of claim 6, wherein the frame displaying signal is a Vsync signal.

8. The method of claim 6, wherein the storing comprising storing the whole scaled frame in the first when the Vsync signal indicates the whole first frame is displayed.

9. The method of claim 5, wherein the display information of the displayed first frame is a display scan line number of the displayed first frame indicating a number of scan lines of the first frame, which have been displayed.

10. The method of claim 4, wherein the determination comprising determining whether the first buffer has sufficient space for a data unit of the scaled frame according to the display scan line number of the displayed first frame, the scaling comprising scaling the corresponding reference frame to generate a data unit of the scaled frame and the storing comprising storing the data unit of the scaled frame in the first buffer when it is determined the first buffer has sufficient space for the data unit of the scaled frame.

11. The method of claim 10, further comprising:
determining whether the whole scaled frame is generated and stored in the first buffer.

12. The method of claim 1, wherein the first frame is a reference frame and the first buffer is for storing reference frames, and further comprising:
determining whether a second buffer of the storage unit, in which at least a portion of a second frame originally stored therein has been displayed, has sufficient space for a data unit of the next picture according to display information of the displayed second frame;
decoding the data unit of the next picture when it is determined that the second buffer has sufficient space; and
storing the decoded data unit of the next picture in the second frame buffer.

13. The method of claim 12, wherein the display information of the displayed second frame is a display scan line number of the displayed second frame indicating a number of scan lines of the second frame, which have been displayed.

14. The method of claim 12, further comprising:
determining whether the whole next picture is decoded and stored in the second frame buffer.

15. The method of claim 12, wherein the second frame is a reference frame and the second buffer is for storing reference frames.

16. A video decoding system for decoding a bit stream to a plurality of frames, comprising:
a video decoder, for determining whether a size of a current picture is equal to that of a next picture according to the bit stream;
a scaler, for scaling a corresponding reference frame for the next picture to generate a scaled frame when the size of the current picture is not equal to that of the next picture; and
a storage unit, coupled to the video decoder and the scaler, the storage unit having a first buffer for storing the scaled frame, wherein at least a portion of a first frame originally stored in the first buffer is used;
wherein when it is determined that the size of the current picture is not equal to that of the next picture, the next picture is encoded in the bit stream in a mode that the scaled corresponding reference frame is required for decoding the next picture.

17. The system of claim 16, wherein the mode is a Reference Picture Resampling (RPR) mode.

18. The system of claim 16, wherein the video decoder is arranged to decode the next picture when it is determined that the size of the current picture is equal to that of the next picture.

19. The system of claim 16, wherein the first frame is used for displaying.

20. The system of claim 19, wherein the first frame is a B frame and the first buffer is for storing B frames, and the scaler is arranged to determine whether the first buffer has sufficient space for the scaled frame according to display information of the displayed first frame prior to scaling the corresponding reference frame.

21. The system of claim 20, wherein the display information of the displayed first frame is a frame displaying signal indicating whether the whole first frame is displayed.

22. The system of claim 21, wherein the frame displaying signal is a Vsync signal.

23. The system of claim 21, wherein the storage unit is arranged to store the whole scaled frame in the first when the Vsync signal indicates the whole first frame is displayed.

24. The system of claim 20, wherein the display information of the displayed first frame is a display scan line number of the displayed first frame indicating a number of scan lines of the first frame, which have been displayed.

25. The system of claim 19, wherein the scaler is arranged to determine whether the first buffer has sufficient space for a data unit of the scaled frame according to the display scan line number of the displayed first frame, and to scale the corresponding reference frame to generate a data unit of the scaled frame and the storing comprising storing the data unit of the scaled frame in the first buffer when it is determined the first buffer has sufficient space for the data unit of the scaled frame.

26. The system of claim 25, wherein the scaler is arranged to determine whether the whole scaled frame is generated and stored in the first buffer.

27. The system of claim 16, wherein the first frame is a reference frame and the first buffer is for storing reference frames, and the video decoder is utilized for determining whether a second buffer of the storage unit, in which at least a portion of a second frame originally stored therein has been displayed, has sufficient space for a data unit of the next picture according to display information of the displayed second frame, decoding the data unit of the next picture when it is determined that the second buffer has sufficient space, and storing the decoded data unit of the next picture in the second frame buffer.

28. The system of claim 27, wherein the display information of the displayed second frame is a display scan line number of the displayed second frame indicating a number of scan lines of the second frame, which have been displayed.

29. The system of claim 27, wherein the video decoder is arranged to determine whether the whole next picture is decoded and stored in the second frame buffer.

30. The system of claim 27, wherein the second frame is a reference frame and the second buffer is for storing reference frames.

* * * * *